United States Patent
Fang et al.

(10) Patent No.: US 10,880,702 B1
(45) Date of Patent: Dec. 29, 2020

(54) DATA COMMUNICATIONS FOR USER APPLICATIONS THAT ARE EXECUTING IN A WIRELESS USER DEVICE

(71) Applicant: Sprint Communications Company L.P., Overland Park, KS (US)

(72) Inventors: Zheng Fang, McLean, VA (US); Galip Murat Karabulut, Vienna, VA (US); Priyadarshini R. Menon, Potomac, MD (US)

(73) Assignee: Sprint Communications Company L.P., Overland Park, KS (US)

( * ) Notice: Subject to any disclaimer, the term of this patent is extended or adjusted under 35 U.S.C. 154(b) by 30 days.

(21) Appl. No.: 16/430,914

(22) Filed: Jun. 4, 2019

(51) Int. Cl.
*H04W 4/20* (2018.01)
*H04W 76/15* (2018.01)
*H04W 88/08* (2009.01)
*H04W 84/04* (2009.01)

(52) U.S. Cl.
CPC ............. *H04W 4/20* (2013.01); *H04W 76/15* (2018.02); *H04W 84/042* (2013.01); *H04W 88/08* (2013.01)

(58) Field of Classification Search
CPC ....... H04W 4/20; H04W 76/10; H04W 76/11; H04W 76/12; H04W 76/15; H04W 76/20; H04W 76/22; H04W 76/25; H04W 84/04; H04W 84/042; H04W 88/08
See application file for complete search history.

(56) References Cited

U.S. PATENT DOCUMENTS

| | | | |
|---|---|---|---|
| 5,502,721 A * | 3/1996 | Pohjakallio | H04W 74/0866 370/336 |
| 6,031,827 A * | 2/2000 | Rikkinen | H04B 7/2656 370/330 |
| 6,418,324 B1 | 7/2002 | Doviak et al. | |
| 6,961,349 B2 | 11/2005 | Malomsoky et al. | |
| 7,251,235 B2 | 7/2007 | Wentink | |
| 7,590,055 B2 | 9/2009 | Segel | |
| 7,975,079 B2 | 7/2011 | Bennett et al. | |
| 8,750,207 B2 | 6/2014 | Jeong et al. | |
| 9,083,416 B2 | 7/2015 | Bolinth et al. | |
| 9,456,464 B2 | 9/2016 | Biswas et al. | |
| 9,961,719 B2 | 5/2018 | Fang et al. | |
| 2011/0235546 A1* | 9/2011 | Horn | H04W 48/17 370/254 |
| 2012/0230305 A1* | 9/2012 | Barbu | H04W 72/085 370/338 |

(Continued)

FOREIGN PATENT DOCUMENTS

WO 2009132290 A2 10/2009
WO 2016019095 A1 2/2016

*Primary Examiner* — Kevin D Mew

(57) ABSTRACT

A wireless User Equipment (UE) executes user applications and responsively determines parallel wireless connections and a data allocation from the user applications to the wireless connections. The UE exchanges network signaling with wireless access points and receives network addresses for the parallel wireless connections. The UE receives uplink data from the executing user applications and addresses the uplink data per the data allocation to allocate the data from the user applications to the wireless connections. The UE transfers the uplink data over the parallel wireless connections. The UE receives downlink data for the executing user applications from the wireless connections and transfers the downlink data to the user applications.

20 Claims, 7 Drawing Sheets

(56) References Cited

U.S. PATENT DOCUMENTS

| | | |
|---|---|---|
| 2013/0064198 A1 | 3/2013 | Krishnaswamy et al. |
| 2015/0365946 A1* | 12/2015 | Luong .................. H04L 1/0003 |
| | | 370/329 |
| 2017/0272990 A1* | 9/2017 | Mutikainen ....... H04W 36/0069 |
| 2017/0289761 A1* | 10/2017 | Stojanovski .......... H04L 5/0058 |
| 2018/0041934 A1* | 2/2018 | Agarwal ............... H04L 65/608 |
| 2018/0084471 A1* | 3/2018 | Emmanuel ............ H04W 24/08 |
| 2019/0116518 A1* | 4/2019 | Stojanovski .......... H04L 67/146 |
| 2019/0150214 A1* | 5/2019 | Zhou ..................... H04L 1/1621 |
| | | 370/329 |

* cited by examiner

US 10,880,702 B1

DATA COMMUNICATIONS FOR USER APPLICATIONS THAT ARE EXECUTING IN A WIRELESS USER DEVICE

TECHNICAL BACKGROUND

Wireless communication networks provide wireless data services like voice-calling, internet-access, and machine control to wireless user devices like phones, computers, and robots. The wireless communication networks have wireless access points that exchange wireless signals with the wireless user devices. The wireless signals transport user data and network signaling. The wireless access points exchange the user data and network signaling with other network elements to help deliver the wireless data services. Exemplary wireless communication networks include Fifth Generation New Radio (5GNR), Long Term Evolution (LTE), and Institute of Electrical and Electronic Engineers (IEEE) 802.11 (WIFI).

The wireless user devices have circuitry to execute operating systems and user applications. The user applications vary widely and include applications for social networking, media streaming, gaming, messaging, machine control, business transactions, and the like. The user applications often communicate with corresponding application servers to serve the end-user. For example, a video application downloads videos from a video server, and a drone application receives control messages from an air-control server.

Some wireless user devices have multiple radios and can establish multiple wireless links in parallel. For example, a wireless user device may use 5GNR, LTE, and WIFI links at the same time. When using the parallel wireless links, the wireless user devices may transmit redundant data over multiple links for better reliability or they may transmit different data over the links for larger throughput. In a typical scenario, the user applications call the operating system for data communications, and the operating system directs the device to execute network applications to serve the wireless communications. The network applications direct the radios to establish one or more wireless links to serve the user applications.

The user applications and the radios are largely isolated from one another by the operating system and the network applications. The isolation leads to a lack of intelligent coupling between the user applications and the radios in the wireless user devices. Unfortunately, the wireless user devices do not intelligently serve their user applications over parallel wireless connections.

TECHNICAL OVERVIEW

A wireless User Equipment (UE) executes user applications and responsively determines parallel wireless connections and a data allocation from the user applications to the wireless connections. The UE exchanges network signaling with wireless access points and receives network addresses for the parallel wireless connections. The UE receives uplink data from the executing user applications and addresses the uplink data per the data allocation to allocate the data from the user applications to the wireless connections. The UE transfers the uplink data over the parallel wireless connections. The UE receives downlink data for the executing user applications from the wireless connections and transfers the downlink data to the user applications.

DETAILED DESCRIPTION

Figure 1:
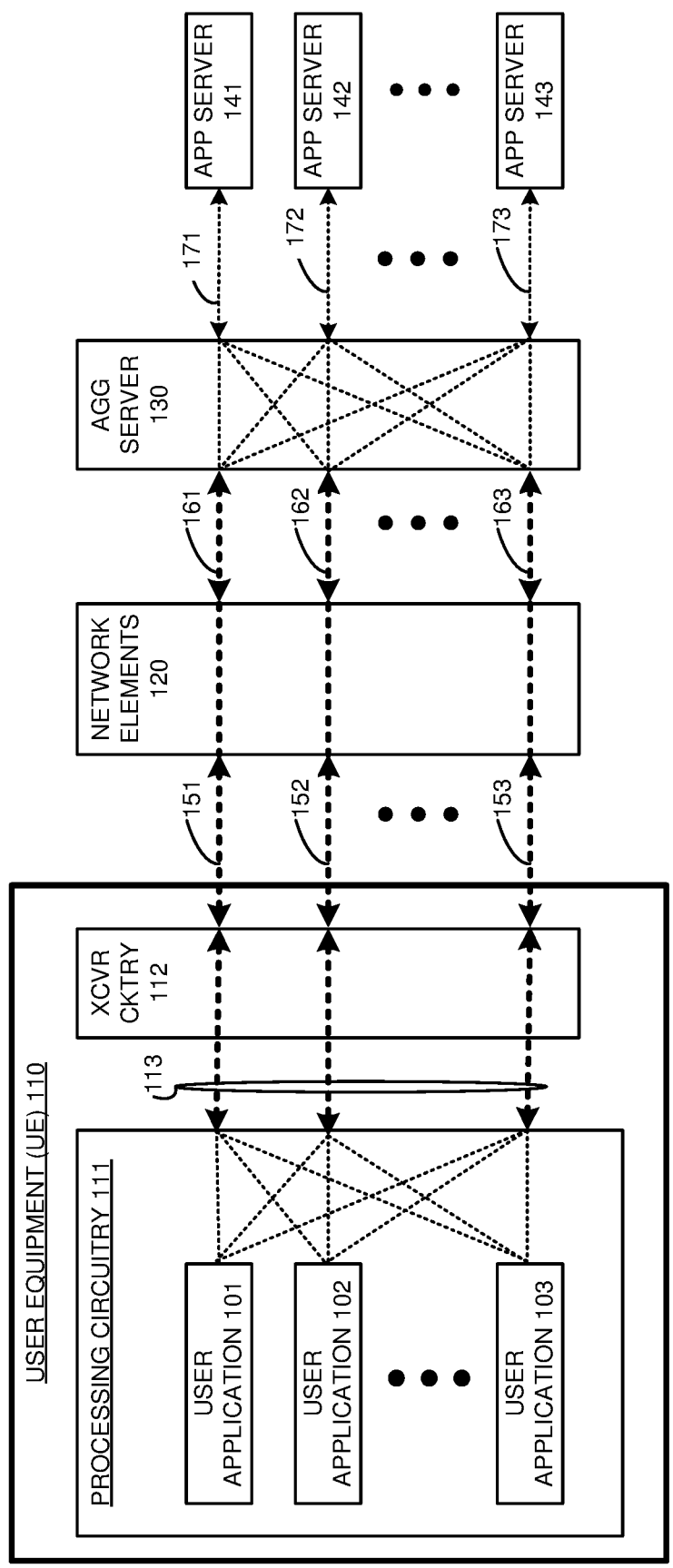
FIG. 1 illustrates wireless User Equipment (UE) that serves user applications over parallel wireless connections.

FIG. 1 illustrates wireless User Equipment (UE) 110 that serves user applications 101-103 over parallel wireless connections 151-153. UE 110 might be a phone, computer, robot, vehicle, sensor, or some other apparatus with communication circuitry. UE 110 comprises processing circuitry 111 and transceiver circuitry (XCVR CKTRY) 112 that are coupled over data links 113. Processing circuitry 111 stores and executes user applications 101-103. User applications 101-103 and their respective application servers 141-141 support data services like media-conferencing, messaging, social-networking, media-streaming, machine communications, and internet access. FIG. 1 has been simplified for clarity and there are typically more user applications, parallel links, and application servers than the amount shown.

In UE 110, transceiver circuitry 112 comprises antennas, modulators, amplifiers, filters, digital/analog interfaces, microprocessors, memory, and bus connections. Processing circuitry 111 comprises microprocessors, memory, user interfaces, and bus connections. In circuitry 111-112, the microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disk drives, and/or the like. The memories store an operating system, network applications, and user applications.

The microprocessors execute the operating system, network applications, and user applications to wirelessly exchange user data with network elements 120 over parallel wireless connections 151-153. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). Parallel wireless access connections 151-153 may use Fifth Generation New Radio (5GNR), Long Term Evolution (LTE), International Institute of Electrical and Electronics (IEEE) 802.11 (WIFI), and/or the like.

Network elements 120 comprise radios, computer hardware, and software. Exemplary network elements 120 comprise gNodeBs, Access and Mobility Management Functions (AMFs), User Plane Functions (UPFs), eNodeBs, Mobility Management Entities (MMEs), Serving Gateways (SGWs), WIFI routers, and/or the like. Aggregation (AGG) server 130 and application servers 141-143 comprise computer hardware and software. Network elements 120 exchange the user data with aggregation server 130 over parallel network connections 161-163. Aggregation server 130 exchanges the user data with applications servers 141-143 over respective application connections 171-173. Parallel network connections 161-163 and application connections 171-173 may use IEEE 802.3 (ETHERNET), Internet Protocol (IP), 5GNR, LTE, WIFI, and/or the like.

Initially, parallel connections 151-153 and 161-163 are not established between transceiver circuitry 112 and aggregation server 130. In UE 110, processing circuitry 110 starts to execute user application 101 but does not yet execute user applications 102-103. In response to executing just user application 101, processing circuitry 110 selects parallel wireless connections 151-152 to support user application 101. Processing circuitry 110 does not yet select wireless connection 153. Processing circuitry 110 determines a data allocation for user application 101 over parallel wireless connections 151-152 and network connections 161-162. For example, the data allocation could be 40% of the application data for user application 101 over connections 151/161, and 60% of data for user application 101 over connections 152/162. Separate data allocations for the uplink and the downlink may be used. For example, another data allocation for user application 101 could be 40% of the uplink data over connections 151/161, 60% of the uplink data over connections 152/162, 80% of the downlink data over connections 151/161, and 20% of the downlink data over connections 152/162. The data allocation effectively comprises a Quality-of-Service (QoS) level for user application 101 when the QoS of connections 151/161 differs from the QoS of connections 152/162. Processing circuitry 111 transfers connection requests for parallel wireless connections 151-152 and network connections 161-162 to transceiver circuitry 112 over data links 113. In some examples, the connections requests are Packet Data Network (PDN) Access Point Name (APN) connections requests.

In response to the connection requests, transceiver circuitry 112 exchanges network signaling with wireless access points in network elements 120. The network signaling transfers the connection requests for wireless connections 151-152 and network connections 161-162 from UE 110 to network elements 120. In response to one of the connection requests, network elements 120 establish and link wireless connection 151 and network connection 161 between UE 110 and aggregation server 130. In response to the other connection request, network elements 120 establish and link wireless connection 152 and network connection 162 between UE 110 and aggregation server 130. The establishment of links 151/161 includes the selection of network addresses for UE 101 and aggregation server 130. The establishment of links 152/162 includes the selection of additional network addresses for UE 101 and aggregation server 130. In some examples, the network addresses comprise Internet Protocol (IP) source and destination addresses although other routing technology could be used. Transceiver circuitry 112 transfers the network addresses for wireless connections 151-152 and network connections 161-162 to processing circuitry 111. Using the network addresses, processing circuitry 111 and aggregation server 130 exchange network signaling over transceiver circuitry 112 and network elements 120 to identify UE 110, executing user application 101, the network addresses, and the data allocation.

Processing circuitry 110 receives uplink data from user application 101. Processing circuitry 110 addresses the uplink data to allocate the uplink data from user application 101 to parallel wireless connections 151-152 per the data allocation. For example, processing circuitry 110 may address 30% of the uplink data for wireless connection 151 and address 70% of the uplink data for wireless connection 152 to achieve a 70/30 data allocation. Processing circuitry 110 marks the uplink data to indicate user application 101 and UE 110. Processing circuitry 110 transfers the addressed and marked uplink data to transceiver circuitry 112 over data links 113.

Transceiver circuitry 112 transfers addressed and marked uplink data over parallel wireless connections 151-152 to network elements 120. Network elements 120 transfer the uplink data to aggregation server 130 over parallel network connections 161-162. Based on the application ID and user ID in the uplink data, aggregation server 130 transfers the uplink data for user application 101 from network connections 161-162 to application server 141 over application connection 171. Typically, aggregation server 130 performs a Network Address Translation (NAT) to use a single address pair for UE 110 and application server 141 over application link 171.

Application server 141 transfers downlink data for user application 101 in UE 110 to aggregation server 130 over application link 171—typically using the single address pair for UE 110 and application server 141. Aggregation server 130 addresses the downlink data for network connections 161-162 based on the data allocation. Aggregation server 130 marks the downlink data to indicate user application 101 and UE 110. Aggregation server 130 transfers addressed and marked downlink data over parallel network connections 161-162 to network elements 120. Network elements 120 transfer the downlink data to processing circuitry 111 over parallel wireless connections 151-152 and transceiver circuitry 112. Based on the application ID, processing circuitry 111 transfers the downlink data from wireless connections 151-152 to user application 101.

In UE 110, processing circuitry 110 starts to execute user application 102 along with user application 101. In response to executing user applications 101-102, processing circuitry 110 reselects parallel wireless connections 151-152 to support user applications 101-102. In this case, no additional connections are made for the extra user application. Processing circuitry 110 determines another data allocation for user applications 101-102 over parallel wireless connections 151-152 and network connections 161-162. The data allocation comprises a QoS level for user application 101 and another QoS level for user application 102 as network resources are consumed based on the data allocation. Using the network addresses, processing circuitry 111 and aggregation server 130 exchange network signaling to identify UE 110, user applications 101-102, and the data allocation for user applications 101-102.

Processing circuitry 110 receives uplink data from user applications 101-102. Processing circuitry 110 addresses the uplink data for user applications 101-102 to allocate the uplink data to parallel wireless connections 151-152 and network connections 161-162 per the data allocation. Processing circuitry 110 marks the uplink data for user application 101 to indicate user application 101 and UE 110 and marks the uplink data for user application 102 to indicate user application 102 and UE 110. Processing circuitry 110 transfers the addressed and marked uplink data over transceiver circuitry 112 and parallel wireless links 151-152 to network elements 120. Network elements 120 transfer the addressed and marked uplink data over parallel network connections 161-162 to aggregation server 130. Based on the application IDs and user ID, aggregation server 130 transfers the uplink data for user application 101 from network connections 161-162 to application server 141 over application connection 171. Based on the application IDs and user ID, aggregation server 130 transfers the uplink data for user application 102 from network connections 161-162 to application server 142 over application connection 172.

Application servers 141-142 transfer downlink data for user applications 101-102 to aggregation server 130 over application links 171-172. Aggregation server 130 addresses the downlink data for network connections 161-162 based on the data allocation. Aggregation server 130 marks the downlink data from application server 141 to indicate user application 101 and UE 110 and marks the downlink data from application server 142 to indicate user application 102 and UE 110. Aggregation server 130 transfers addressed and marked downlink data over parallel network connections 161-162 to network elements 120. Network elements 120 transfer the downlink data to processing circuitry 111 over parallel wireless connections 151-152 and transceiver circuitry 112. Based on the application IDs, processing circuitry 111 transfers the downlink data from application server 141 to user application 101 and transfers the downlink data from application server 142 to user application 102.

In UE 110, processing circuitry 110 then starts to execute user application 103 along with user applications 101-102. In response to executing user applications 101-103, processing circuitry 110 now selects parallel wireless connections 151-153 to support user applications 101-103. Thus, a connection is added in response to the additional user application. Processing circuitry 110 determines a data allocation for each of user applications 101-103 over parallel wireless connections 151-153 and network connections 161-163. Processing circuitry 111 transfers a connection request for wireless connection 153 to transceiver circuitry 112 over data links 113.

In response to the connection request, transceiver circuitry 112 exchanges network signaling with one or more wireless access points in network elements 120. The network signaling transfers the connection request for wireless connection 153 and network connection 163 from UE 110 to network elements 120. In response to the connection request, network elements 120 establish and link wireless connection 153 and network connection 163 between UE 110 and aggregation server 130. The connection establishment includes the selection of more network addresses for UE 101 and aggregation server 130. Transceiver circuitry 112 transfers the network addresses for wireless connection 153 to processing circuitry 111. Using the network addresses, processing circuitry 111 and aggregation server 130 exchange network signaling over transceiver 112 and network elements 120 to identify UE 110, user applications 101-103, their network addresses, and their data allocation.

Processing circuitry 110 receives uplink data from user applications 101-103. Processing circuitry 110 addresses the uplink data to allocate the data from user applications 101-103 to parallel wireless connections 151-153 per their data allocation. For example, user applications 101-102 may each receive 25% of connections 151-153 and 161-163, while user application 103 receives 50% of connections 151-153 and 161-163. Processing circuitry 110 marks the uplink data to indicate UE 110 and the appropriate user applications 101-103. Processing circuitry 110 transfers the addressed and marked uplink data to transceiver circuitry 112 over data links 113.

Transceiver circuitry 112 transfers addressed and marked uplink data over parallel wireless connections 151-153 to network elements 120. Network elements 120 transfer the uplink data to aggregation server 130 over parallel network connections 161-163. Based on the application IDs and user ID, aggregation server 130 transfers the uplink data from network connections 161-163 to application servers 141-143 over application connections 171-173.

Application servers 141-143 transfer downlink data for user applications 101-103 in UE 110 to aggregation server 130 over application links 171-173. Aggregation server 130 addresses the downlink data for network connections 161-163 based on the data allocation for each of user applications 101-103. Aggregation server 130 marks the downlink data to indicate UE 110 and the associated user applications 101-103. Aggregation server 130 transfers addressed and marked downlink data over parallel network connections 161-163 to network elements 120. Network elements 120 transfer the downlink data to processing circuitry 111 over parallel wireless connections 151-153 and transceiver circuitry 112. Based on the application IDs, processing circuitry 111 transfers the downlink data from wireless connections 151-153 to user applications 101-103. UE 110 releases wireless connections 151-153 and network connections 161-163 in a reciprocal manner when individual user applications 101-103 stop executing in UE 101.

Figure 2:
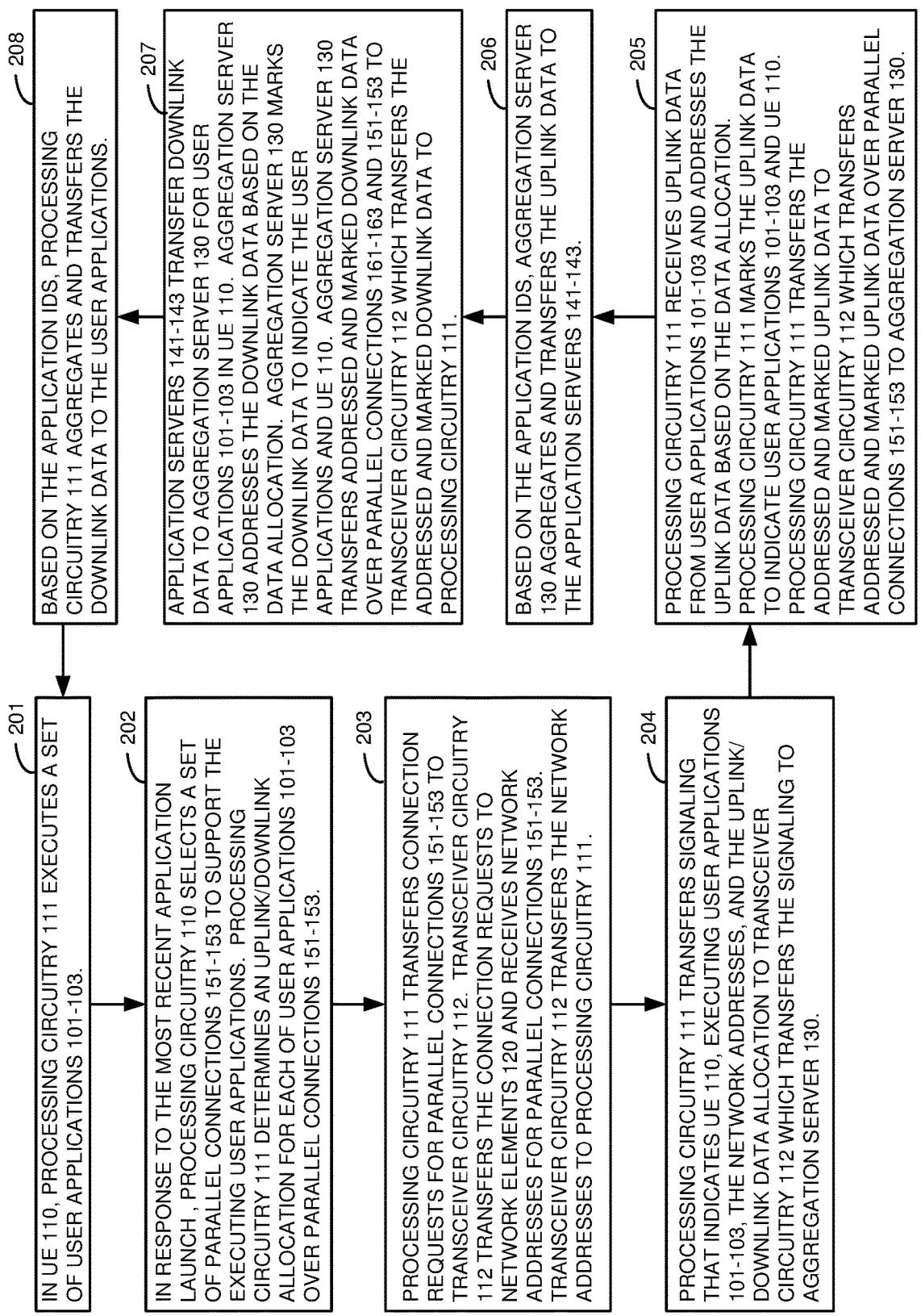
FIG. 2 illustrates the operation of the wireless UE to serve the user applications over the parallel wireless connections.

FIG. 2 illustrates the operation of wireless UE 110 to serve user applications 101-103 over parallel wireless connections 151-153. In UE 110, processing circuitry 110 executes a set of user applications (201). In response to the most recent application launch, processing circuitry 110 selects a set of parallel connections to support the current set of executing user applications (202). Processing circuitry 110 determines an uplink/downlink allocation for each of the user applications over the parallel connections (202). Processing circuitry 111 transfers connection requests (RQs) for the parallel connections to transceiver circuitry 112 (203). Transceiver circuitry 112 transfers the connection requests in network signaling to network elements 120 and receives network addresses for the parallel connections in response (203). Transceiver circuitry 112 transfers the network addresses for the parallel connections to processing circuitry 111 (203). Processing circuitry 111 transfers network signaling that indicates UE 110, the executing user applications, the network addresses for the executing user applications, and the uplink/downlink data allocation for the executing user applications to transceiver circuitry 112 (204). Transceiver circuitry 112 transfers the network signaling to aggregation server 130 (204).

Processing circuitry 110 receives uplink data from the executing user applications (205). Processing circuitry 110 addresses the uplink data based on the data allocation for the user applications (205). Processing circuitry 110 marks the uplink data to indicate the associated user applications and UE 110 (205). Processing circuitry 110 transfers the addressed and marked uplink data to transceiver circuitry 112 (205). Transceiver circuitry 112 transfers the addressed and marked uplink data over the parallel connections to aggregation server 130 (205). Based on the application IDs, aggregation server 130 aggregates and transfers the uplink data for the user applications to their application servers.

The application servers transfer downlink data to aggregation server 130 for the user applications in UE 110 (207). Aggregation server 130 addresses the downlink data for the user applications based on the data allocation for each user application (207). Aggregation server 130 marks the downlink data to indicate the related user applications and UE 110 (207). Aggregation server 130 transfers the addressed and marked downlink data over the parallel connections to transceiver circuitry 112 (207). Transceiver circuitry 112 transfers the addressed and marked downlink data to processing circuitry 111 (207). Based on the application IDs, processing circuitry 111 transfers the downlink data to the user applications (208). The operation repeats (201).

Figure 3:
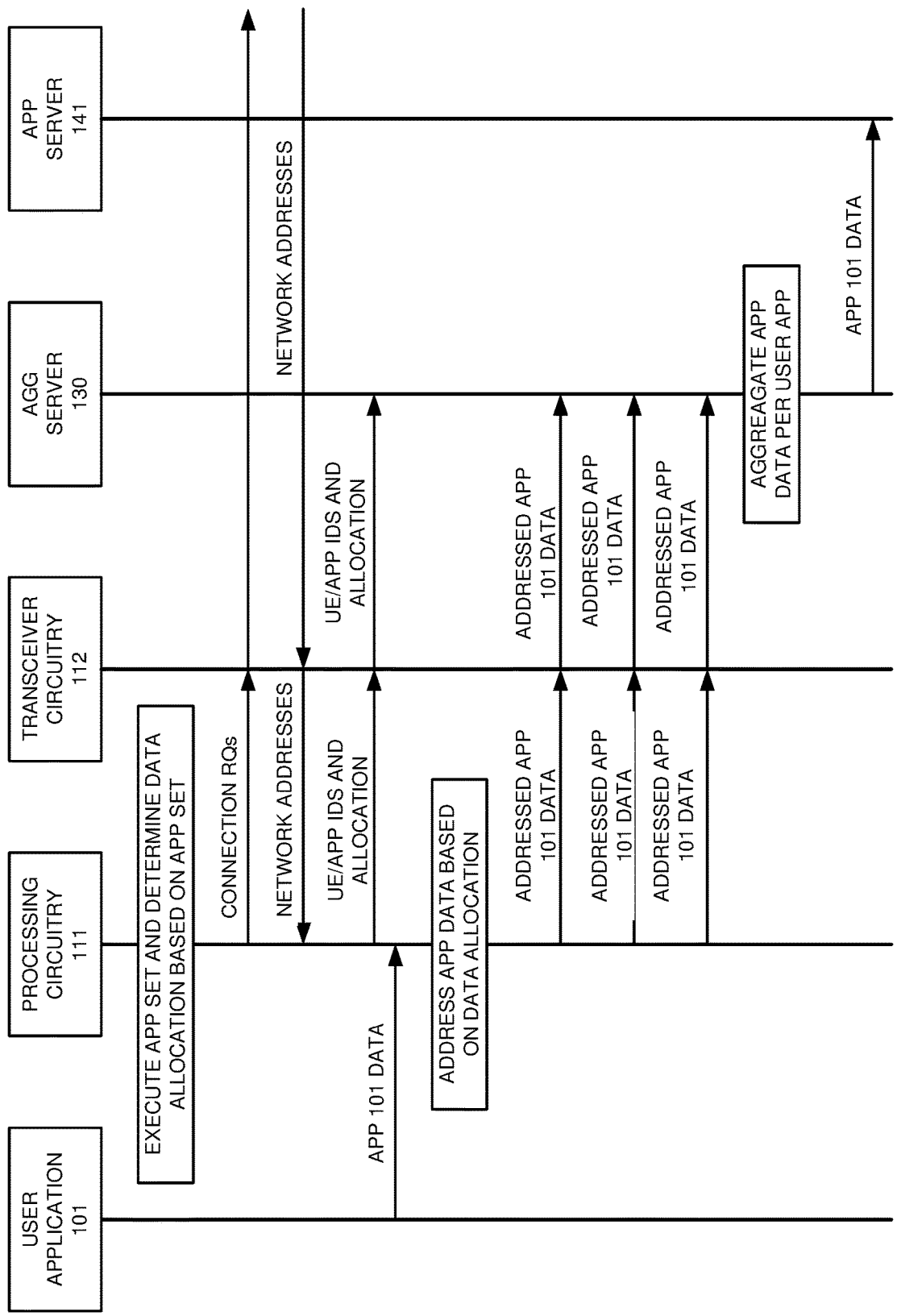
FIG. 3 illustrates the operation of the wireless UE to serve the user applications over the parallel wireless connections.
Figure 4:
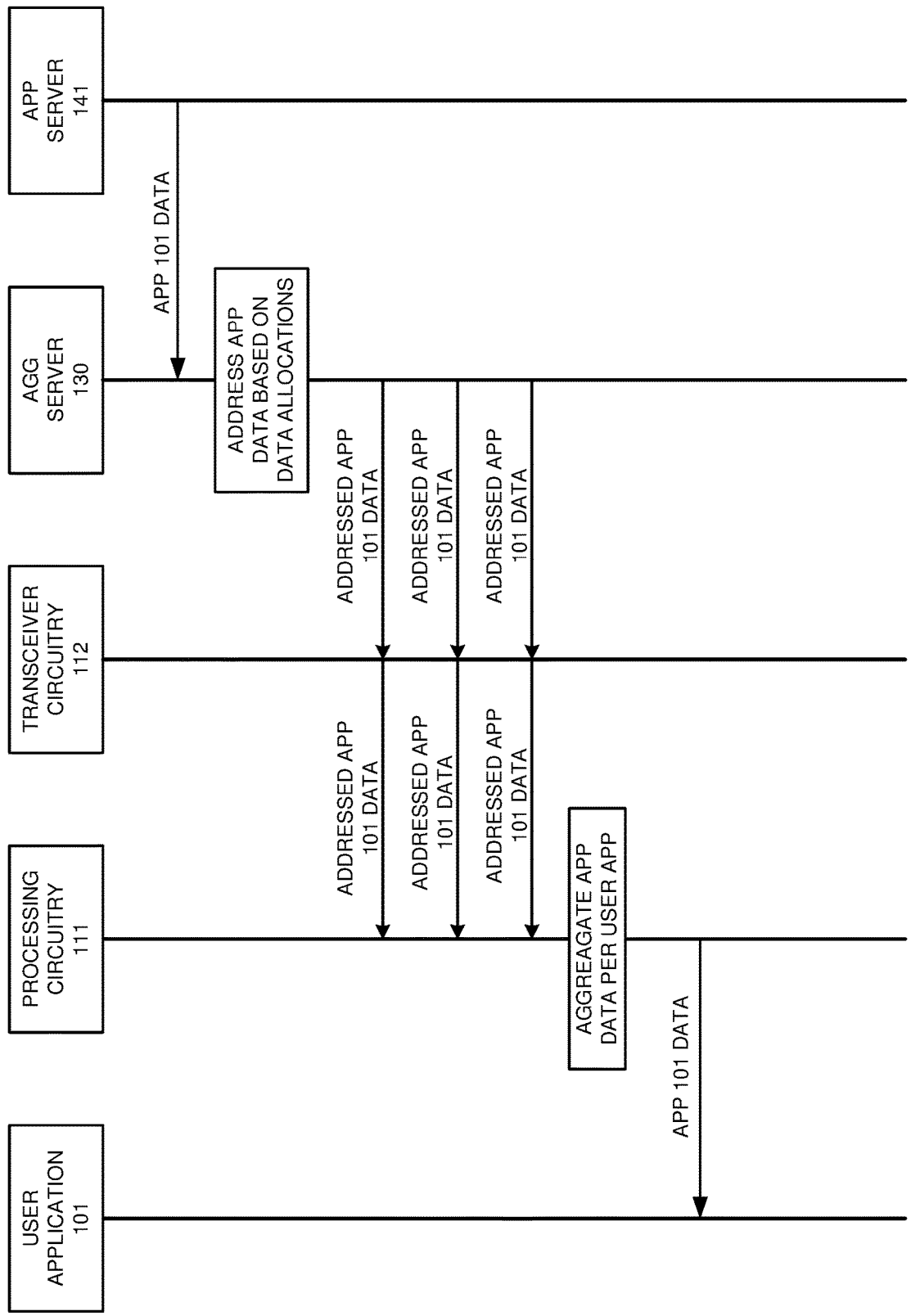
FIG. 4 illustrates the operation of the wireless UE to serve the user applications over the parallel wireless connections.

FIGS. 3-4 illustrate the operation of wireless UE 110 to serve user application 101 over parallel connections. Referring to FIG. 3, processing circuitry 110 in UE 110 executes a set of user applications (APP SET) that includes user application 101 which is also the last of the applications to be launched. In response to executing user application 101, processing circuitry 110 selects a set of parallel connections to support the user applications. Processing circuitry 110 determines an uplink/downlink data allocation over the parallel connections for each of the executing user applications. Processing circuitry 111 transfers connection requests (RQs) for the parallel connections to transceiver circuitry 112. In response, transceiver circuitry 112 transfers the connection requests in network signaling to network elements 120 (not shown). In response to the network signaling, transceiver circuitry 112 receives network addresses for the parallel connections. Transceiver circuitry 112 transfers the network addresses for the parallel connections to processing circuitry 111. Processing circuitry 111 transfers network signaling to transceiver circuitry 112 that indicates UE 110, the executing user applications, the network addresses for the executing user applications, and the uplink/downlink data allocation for each of the executing user applications. Transceiver circuitry 112 transfers the network signaling to aggregation server 130.

Processing circuitry 110 receives uplink data from user application 101. Processing circuitry 110 addresses the uplink data based on the data allocation for user application 101 over the parallel connections. Processing circuitry 110 marks the uplink data to indicate user application 101 and UE 110. Processing circuitry 110 transfers the addressed and marked uplink data to transceiver circuitry 112. Transceiver circuitry 112 transfers addressed and marked uplink data over the parallel connections to aggregation server 130. Based on the application ID, aggregation server 130 aggregates and transfers the uplink data from user application 101 to application server 141.

Referring to FIG. 4, application server 141 transfers downlink data to aggregation server 130 for user application 101 in UE 110. Aggregation server 130 addresses the downlink data for user application 101 based on the data allocation. Aggregation server 130 marks the downlink data to indicate user application 101 and UE 110. Aggregation server 130 transfers addressed and marked downlink data over the parallel connections to transceiver circuitry 112. Transceiver circuitry 112 transfers the addressed and marked downlink data to processing circuitry 111. Based on the application ID, processing circuitry 111 aggregates and transfers the downlink data to user application 101.

Figure 5:
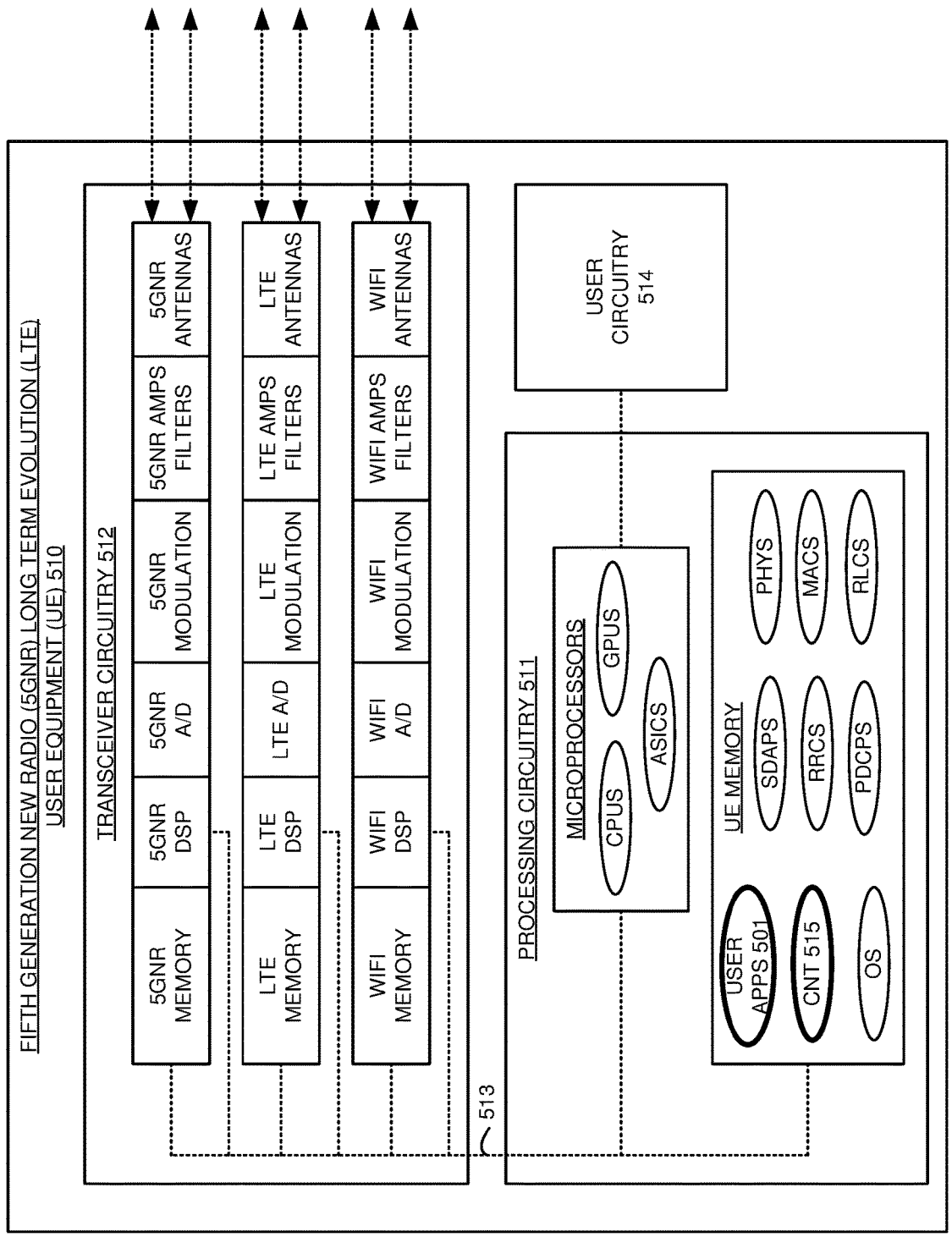
FIG. 5 illustrates a Fifth Generation New Radio (5GNR)/Long Term Evolution (LTE) User Equipment (UE) that serves user applications over parallel wireless connections.

FIG. 5 illustrates Fifth Generation New Radio (5GNR)/Long Term Evolution (LTE) User Equipment (UE) 510 that serves user applications 501 over parallel wireless connections. 5GNR/LTE UE 510 is an example of UE 110 although UE 110 may differ. 5GNR/LTE UE 510 comprises transceiver circuitry 512, processing circuitry 511, bus circuitry 513, and user circuitry 514. User circuitry 514 comprises graphic displays, machine controllers, sensors, cameras, transceivers, and/or some other user interface components. Transceiver circuitry 512 comprises radios for 5GNR, LTE, and WIFI. The radios each comprise antennas, amplifiers (AMPS), filters, modulation, analog/digital interfaces (A/D), Digital Signal Processors (DSPs), and memory. The radios may share some components. Transceiver circuitry 512 has been simplified for clarity and may include additional 5GNR radios, LTE radios, and WIFI radios that are configured and controlled in a similar manner.

Processing circuitry 511 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system (OS), communication controller (CNT) 515, user applications 501, and network applications for 5GNR, LTE, and WIFI. The network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). The microprocessors execute the operating system, user applications 501, communication controller 515, and the network applications to exchange application data over the parallel connections.

Communication controller 515 hosts a data structure that correlates different combinations of user applications 501 with different sets of parallel connections. A network provisioning system may download the data structure to communication controller 515. Communication controller 515 identifies the current combination of executing user applications 501. Communication controller 515 enters the data structure with the combination of executing user applications 501 to yield a specific set of parallel connections and a data allocation for user applications 501 over the parallel connections. Communication controller 515 generates and transfers connection requests for the parallel connections to the 5GNR RRC, LTE RRC, and/or WIFI RLC. The RLC and RRCs generate and transfer network signaling with the connection requests to transceiver circuitry 512 over the network applications and bus circuitry 513. In transceiver circuitry 512, the radios wirelessly exchange network signaling having the connection requests with wireless access points. The network signaling also transports network addresses for the parallel connections from the wireless access points to transceiver circuitry 512. Transceiver circuitry 512 transfers the network addresses to communication controller 515 over bus circuitry 513 and the network applications.

Executing user applications 501 store Uplink (UL) application data in the UE memory. Communication controller 515 addresses the UL application data for the parallel connections based on the data allocation for executing user applications 501. Communication controller 515 marks the UL application data with a UE ID and an APP ID for associated user applications 501. The network applications process the UL application data and Downlink (DL) network signaling to generate UL network signaling. The network applications transfer the UL application data and network signaling to their respective radio memories in transceiver circuitry 512.

In transceiver circuitry 512, the DSPs process the UL application data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless UL signals that transport the UL application data and network signaling to the wireless access points.

In the transceiver circuitry 512, the antennas receive wireless DL signals that transport application data and network signaling from the wireless access points. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL application data and network signaling. The microprocessors execute the network applications to store the DL application data in the UE memory. Communication controller 515 aggregates the DL application data in the UE memory for individual user applications 501 based on the APP IDs. User applications 501 process their aggregated application data in the UE memory.

In processing circuitry 511, the 5GNR SDAP maps between application data and Service Data Units (SDUs). The 5GNR RRC maps between network signaling and SDUs. The LTE RRC maps between application data/network signaling and SDUs. The 5GNR/LTE SDAP/RRCs exchange their SDUs with the 5GNR PDCP and the LTE PDCP. The PDCPs map between the SDUs and Protocol Data Units (PDUs). The 5GNR/LTE PDCPs exchange the PDUs with the 5GNR RLC, LTE RLC and WIFI RLC. The RLCs map between the PDUs and MAC logical channels. The RLCs exchanges the application data and network signaling with the MACs over the MAC logical channels. The MACs map between the MAC logical channels and MAC transport channels. The MAC exchanges the application data and network signaling with the PHYs over the MAC transport channels. The PHYs map between the MAC transport channels and PHY transport channels. The PHYs exchange the application data and network signaling with PHYs in the wireless access points over the PHY transport channels.

RRC functions also comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In some examples, some or all of communication controller 515 is integrated into the operating system. In some examples, some or all of communication controller 515 is integrated into the 5GNR RRC and/or the LTE RRC. In some examples, some or all of communication controller 515 could be distributed across the operating system, 5GNR RRC, and/or LTE RRC.

Figure 6:
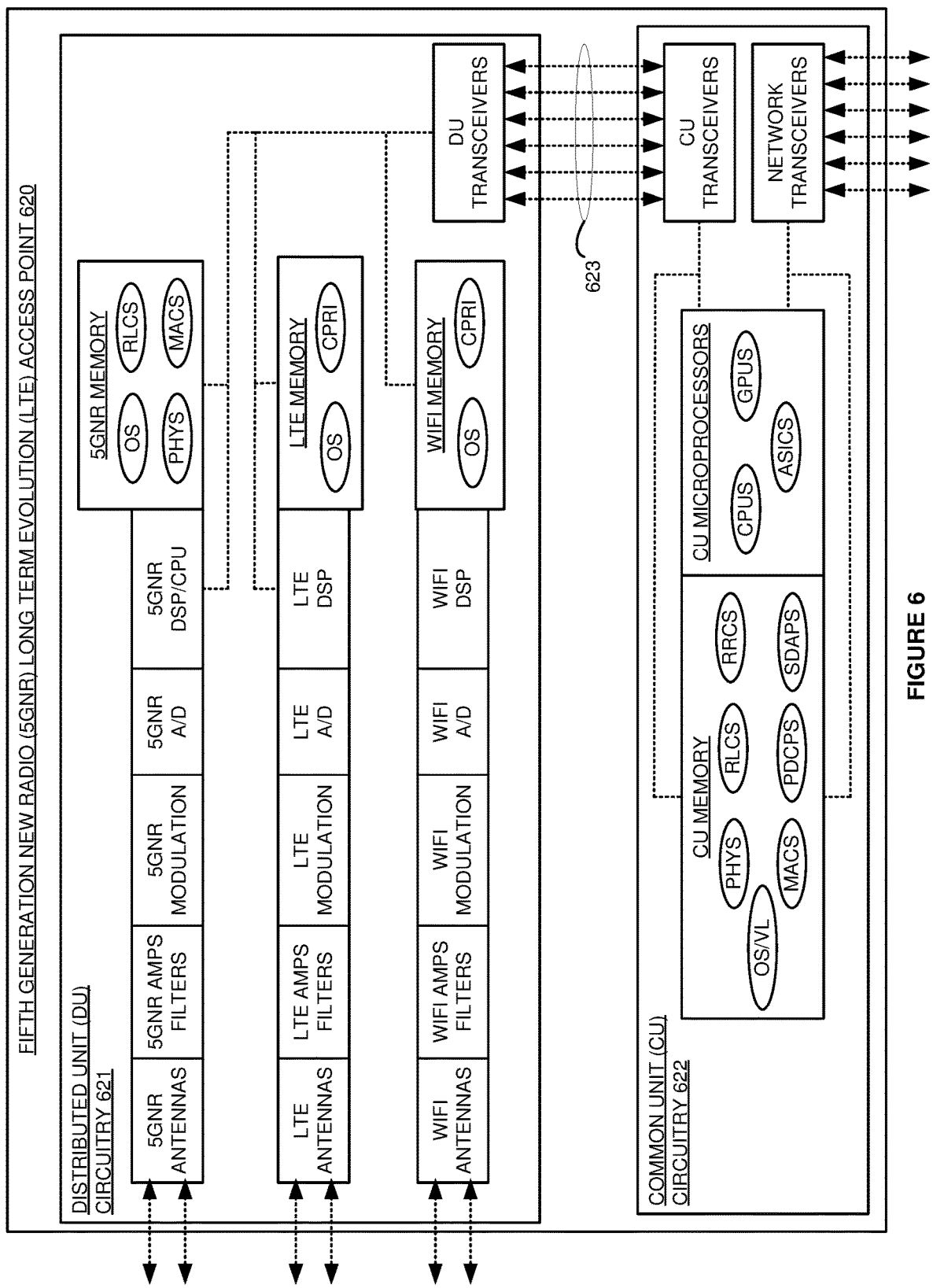
FIG. 6 illustrates a 5GNR/LTE wireless access point that serves 5GNR/LTE UEs over parallel wireless connections.

FIG. 6 illustrates 5GNR/LTE access point 620 that serves UEs and their user applications over parallel wireless connections. 5GNR/LTE access point 620 comprises an example of network elements 120, although network elements 120 may differ. 5GNR/LTE access point 620 comprises Distributed Unit (DU) circuitry 621, Centralized Unit (CU) circuitry 622, and network links 623. DU circuitry 621 comprises DU transceivers and radios for 5GNR, LTE, and WIFI. The radios each comprise antennas, amplifiers/filters, modulation, A/D interfaces, DSP/CPUs, memory, and DU transceivers that are coupled over bus circuitry and/or some other data links.

5GNR CU circuitry 622 comprises CU microprocessors, CU memory, CU transceivers, and network transceivers that are coupled over bus circuitry and/or some other data links. The antennas in DU circuitry 621 are coupled to 5GNR/LTE UEs over wireless 5GNR, LTE, and WIFI connections. The CU transceivers are coupled to the DU transceivers over data links 623. The network transceivers in CU circuitry 622 are coupled to network elements like Access and Mobility Management Function (AMF), User Plane Function (UPF), Mobility Management Entity (MME), and Serving Gateway (SGW).

The 5GNR memory stores an operating system and network applications for PHY, MAC, and RLC. The LTE memory stores an operating system and a network application for LTE Common Public Radio Interface (CPRI). The WIFI memory stores an operating system and a network application for WIFI Common Public Radio Interface (CPRI). The CU memory stores an operating system, virtual layer (VL) components, and network applications. The virtual layer components comprise hypervisor modules, virtual switches, virtual machines, and/or the like. The network applications include 5GNR PDCP, 5GNR RRC, 5GNR SDAP, LTE PHY, LTE MAC, LTE RLC, LTE PDCP, LTE RRC, WIFI PHY, WIFI MAC, and WWI RLC. In this example, DU circuitry 621 hosts the 5GNR network applications for PHY, MAC, and RLC while CU circuitry 622 hosts the 5GNR network applications for PDCP, RRC, and SDAP. In other examples, DU circuitry 621 and CU circuitry 622 may use other network application splits.

In DU circuitry 622, the antennas receive wireless UL signals from UEs that transport application data and network signaling. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSPs recover UL symbols from the UL digital signals. The 5GNR CPU executes the 5GNR PHY, 5GNR MAC, and 5GNR RLC to recover PDUs from the UL symbols. The DU transceivers in DU circuitry 621 transfer the UL LTE and WIFI symbols and the UL 5GNR PDUs to the CU transceivers in CU circuitry 622 over data links 623.

In CU circuitry 622, the CU microprocessors execute the 5GNR PDCP, 5GNR RRC, and 5GNR SDAP to recover UL SDAP data and RRC signaling from the UL PDUs. The CU microprocessors execute the LTE PHY, LTE MAC, LTE RLC, LTE PDCP, and LTE RRC to recover UL RRC data and RRC signaling from the UL PDUs. The CU microprocessors execute the WIFI PHY, WIFI MAC, and WIFI RLC to recover UL PDUs for the LTE PDCP or the 5GNR PDCP.

The CU microprocessors execute the 5GNR RRC to process UL/DL RRC signaling to generate UL N2 signaling and DL RRC signaling. The CU microprocessors execute the 5GNR SDAP to process UL SDAP data to generate UL N3 data. The CU microprocessors execute the LTE RRC to process UL/DL RRC data and signaling to generate UL S1-U data and S1-MME signaling and to generate DL RRC data and signaling. The network transceivers transfer the UL N3 data, N2 signaling, S1-U data, and S1-MME signaling to network elements for delivery to an aggregation server.

The network transceivers receive DL N3 data, N2 signaling, S1-U data, and S1-MME signaling from the aggregation server over the network elements. The CU microprocessors execute the 5GNR SDAP to process the DL N3 data to generate DL RRC data. The CU microprocessors execute the 5GNR RRC to process the DL N2 signaling to generate DL RRC signaling and UL N2 signaling. The CU microprocessors execute the LTE RRC to process the DL S1-U data and S1-MME signaling to generate DL RRC data and RRC signaling and to generate UL S1-MME signaling. The CU microprocessors execute the 5GNR SDAP, RRC, and PDCP to process the DL RRC data and RRC signaling to generate DL PDUs. The CU microprocessors execute the LTE RRC, PDCP, RLC, MAC, and PHY to process the DL RRC data and RRC signaling to generate DL LTE symbols. The CU microprocessors execute the WIFI RLC, MAC, and PHY to process DL PDUs from the PDCPs to generate DL WIFI symbols. The CU transceivers transfer the DL 5GNR PDUs, LTE symbols, and WIFI symbols to the DU transceivers in DU circuitry 621.

In DU circuitry 621, the 5GNR CPU executes the 5GNR RLC, MAC, and PHY to process the DL PDUs to generate DL 5GNR symbols. The 5GNR, LTE, and WIFI DSPs process their symbols to generate corresponding digital DL signals for the A/D interface. The A/D interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless DL signals that transport the DL 5GNR, LTE, and WIFI data and signaling to the UEs.

Figure 7:
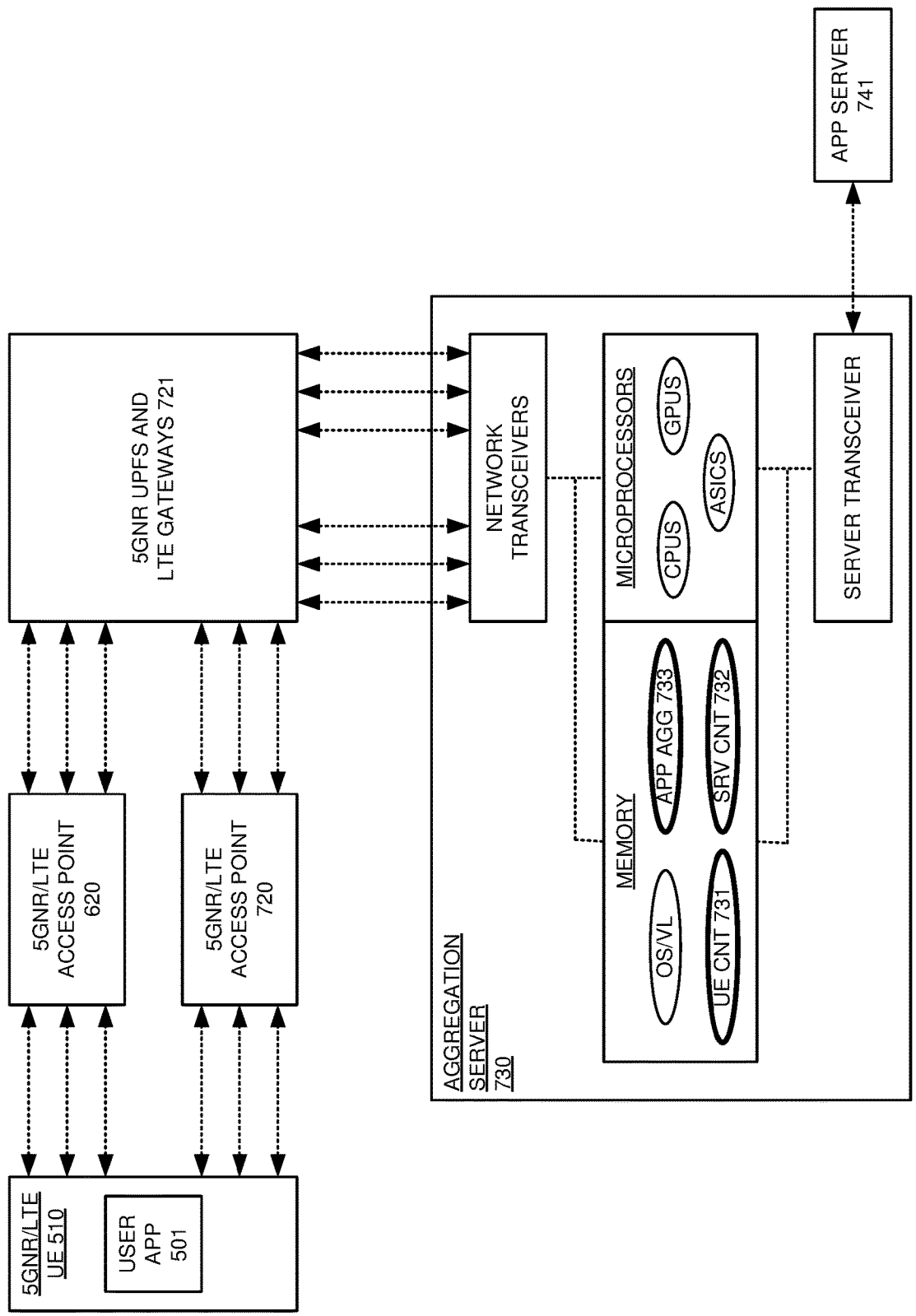
FIG. 7 illustrates an aggregation server that serves user applications executing in the 5GNR/LTE UEs over parallel wireless connections.

FIG. 7 illustrates aggregation server 730 that serves user application 501 in 5GNR/LTE UE 510 over parallel connections. Aggregation server 730 is an example of aggregation server 130, although server 130 may differ. Aggregation server 730 comprises network transceivers, memory, microprocessors, and a server transceiver. The memory stores an operating system, virtual layer, UE controller (CNT) 731, server controller 732, and app aggregator (AGG) 733. The microprocessors comprise CPUs, GPUs, ASIC, and/or the like. The microprocessors execute the operating system, virtual layer, UE controller 731, server controller 732, and app aggregator 733 to exchange application data for user application 501 between 5GNR UPFs and LTE gateways 721 and application server 741.

The network transceiver receives network signaling from UE 501 that indicates UE 510, user application 501, network addresses for the parallel connections between UE 510 and aggregation server 730, and a data allocation for user application 501 over the parallel connections. Server controller 732 establishes an application connection to application server 741 for UE 510. The network transceiver receives application data from UE 501 over the parallel connections. The application data indicates UE 510, user application 501, and the network addresses. Application aggregator 733 processes the application 501 indicator and the UE 510 indicator to aggregate the application data from user application 501 for application server 741. The server transceiver transfers the aggregated application data from user application 501 to application server 741.

The server transceiver receives application data from application server 741 for user application 501 in UE 510. Application aggregator 733 addresses the application data for user application 501 in UE 510 using the network addresses per the data allocation. Application aggregator 733 marks the application data to identify user application 501 and UE 510. Application aggregator 733 transfers the application data to user application 501 over the parallel connections through 5GNR UPF and LTE gateways 721, 5GNR/LTE access point 621, and 5GNR/LTE access point 720. 5GNR/LTE UE 510 processes the application indicator in the application data to aggregate the application data from application server 741 for user application 501. UE 510 transfers the aggregated application data from application server 741 to user application 501.

The wireless data network circuitry described above comprises computer hardware and software that form special-purpose wireless user circuitry to serve user applications over parallel wireless connections. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless user circuitry to serve user applications over parallel wireless connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to serve user applications, the method comprising:
processing circuitry executing the user applications and responsively determining parallel wireless connections and a data allocation from individual ones of the user applications to individual ones of the parallel wireless connections and transferring connection requests for the parallel wireless connections to transceiver circuitry;
the transceiver circuitry exchanging network signaling for the connection requests with wireless access points, receiving individual network addresses for the individual ones of the parallel wireless connections from the wireless access points, and transferring the individual network addresses for the individual ones of the parallel wireless connections to the processing circuitry;
the processing circuitry receiving uplink data from the user applications, addressing the uplink data to allocate the uplink data from the individual ones of the user applications to the individual ones of the parallel wireless connections per the data allocation, and transferring the addressed uplink data to the transceiver circuitry; and
the transceiver circuitry transferring the addressed uplink data over the individual ones of the parallel wireless connections.

2. The method of claim 1 wherein the parallel wireless connections and the network addresses terminate on an aggregation server that aggregates the addressed uplink data for the individual ones of the user applications and transfers the aggregated uplink data for the individual ones of the user applications to application servers for the individual ones of the user applications.

3. The method of claim 1 further comprising:
the transceiver circuitry receiving addressed downlink data over the individual ones of the parallel wireless connections; and
the processing circuitry aggregating the addressed downlink data for the individual ones of the user applications and transferring the aggregated downlink data for the individual ones of the user applications to the individual ones of the user applications.

4. The method of claim 1 wherein:
the processing circuitry transferring the connections requests comprises identifying the wireless UE and the user applications in the connections requests; and
the transceiver circuitry exchanging the network signaling comprises identifying the wireless UE and the user applications in the network signaling.

5. The method of claim 1 wherein the data allocation from the individual ones of the user applications to the individual ones of the wireless connections comprise Quality-of-Service (QoS) levels for the individual ones of the user applications.

6. The method of claim 1 wherein:
the transceiver circuitry exchanging the network signaling comprises a Fifth Generation New Radio (5GNR) radio exchanging 5GNR signaling and receiving 5GNR network addresses; and
the transceiver circuitry receiving the network addresses comprises a Long Term Evolution (LTE) radio exchanging LTE signaling and receiving LTE network addresses.

7. The method of claim 1 wherein the transceiver circuitry exchanging the network signaling comprises an Institute of Electrical and Electronic Engineers (IEEE) 802.11 (WIFI) radio exchanging WIFI signaling and receiving WIFI network addresses.

8. The method of claim 1 wherein the individual network addresses comprise individual internet protocol addresses.

9. The method of claim 1 wherein the processing circuitry executing the user applications, determining the parallel wireless connections and the data allocation, transferring the connection requests, and addressing the uplink data comprises the processing circuitry executing an operating system, and in response, executing the user applications, determining the parallel wireless connections and the data allocation, transferring the connection requests, and addressing the uplink data.

10. The method of claim 1 wherein the processing circuitry executing the user applications, determining the parallel wireless connections and the data allocation, transferring the connection requests, and addressing the uplink data comprises the processing circuitry executing a communication controller, and in response, executing the user applications, determining the parallel wireless connections and the data allocation, transferring the connection requests, and addressing the uplink data.

11. A wireless User Equipment (UE) to serve user applications, the wireless UE comprising:
processing circuitry configured to execute the user applications and responsively determine parallel wireless connections and a data allocation from individual ones of the user applications to individual ones of the parallel wireless connections and transfer connection requests for the parallel wireless connections to transceiver circuitry;
the transceiver circuitry configured to exchange network signaling for the connection requests with wireless access points, receive individual network addresses for the individual ones of the parallel wireless connections from the wireless access points, and transfer the individual network addresses for the individual ones of the parallel wireless connections to the processing circuitry;
the processing circuitry configured to receive uplink data from the user applications, address the uplink data to allocate the uplink data from the individual ones of the user applications to the individual ones of the parallel wireless connections per the data allocation, and transfer the addressed uplink data to the transceiver circuitry; and
the transceiver circuitry configured to transfer the addressed uplink data over the individual ones of the parallel wireless connections.

12. The wireless UE of claim 11 wherein the parallel wireless connections and the network addresses terminate on an aggregation server configured to aggregate the addressed uplink data for the individual ones of the user applications and transfer the aggregated uplink data for the individual ones of the user applications to application servers for the individual ones of the user applications.

13. The wireless UE of claim 11 further comprising:
the transceiver circuitry configured to receive addressed downlink data over the individual ones of the parallel wireless connections; and the processing circuitry configured to aggregate the addressed downlink data for the individual ones of the user applications and transfer the aggregated downlink data for the individual ones of the user applications to the individual ones of the user applications.

14. The wireless UE of claim 11 wherein:

the processing circuitry is configured to identify the wireless UE and the user applications in the connections requests; and the transceiver circuitry configured to identify the wireless UE and the user applications in the network signaling.

15. The wireless UE of claim 11 wherein the data allocation from the individual ones of the user applications to the individual ones of the wireless connections comprise Quality-of-Service (QoS) levels for the individual ones of the user applications.

16. The wireless UE of claim 11 wherein the transceiver circuitry comprises:

a Fifth Generation New Radio (5GNR) radio configured to exchange 5GNR signaling and receive 5GNR network addresses; and a Long Term Evolution (LTE) radio configured to exchange LTE signaling and receive LTE network addresses.

17. The wireless UE of claim 11 wherein the transceiver circuitry comprises an Institute of Electrical and Electronic Engineers (IEEE) 802.11 (WIFI) radio configured to exchange WIFI signaling and receive WIFI network addresses.

18. The wireless UE of claim 11 wherein the individual network addresses comprise individual internet protocol addresses.

19. The wireless UE of claim 11 wherein the processing circuitry comprises an operating system configured to execute the user applications, determine the parallel wireless connections and the data allocation, transfer the connection requests, and address the uplink data.

20. The wireless UE of claim 11 wherein the processing circuitry comprises a communication controller configured to execute the user applications, determine the parallel wireless connections and the data allocation, transfer the connection requests, and address the uplink data.

* * * * *